(12) United States Patent
Delius et al.

(10) Patent No.: US 7,803,437 B2
(45) Date of Patent: Sep. 28, 2010

(54) INTRINSICALLY STABLE SHIRRED PLASTIC FOOD CASING

(75) Inventors: Ulrich Delius, Frankfurt (DE); Dirk Auf Der Heide, Alfhausen (DE); Gerhard Grolig, Moerfelden-Waldorf (DE)

(73) Assignee: Kalle GmbH, Wiesbaden (DE)

( * ) Notice: Subject to any disclaimer, the term of this patent is extended or adjusted under 35 U.S.C. 154(b) by 1024 days.

(21) Appl. No.: 10/568,464

(22) PCT Filed: Aug. 23, 2004

(86) PCT No.: PCT/EP2004/009395

§ 371 (c)(1),
(2), (4) Date: Feb. 14, 2006

(87) PCT Pub. No.: WO2005/020693

PCT Pub. Date: Mar. 10, 2005

(65) Prior Publication Data

US 2006/0234611 A1 Oct. 19, 2006

(30) Foreign Application Priority Data

Aug. 27, 2003 (DE) ................................. 103 39 801

(51) Int. Cl.
*B29D 22/00* (2006.01)
*B29D 23/00* (2006.01)
*B32B 1/08* (2006.01)

(52) U.S. Cl. .................... 428/34.8; 428/35.7; 428/36.9; 428/36.91; 428/36.92; 428/474.4; 428/35.5; 428/35.1; 428/475.5

(58) Field of Classification Search ................ 428/34.8, 428/35.7, 36.9, 36.91, 474.4, 36.92, 35.5, 428/35.1, 475.5
See application file for complete search history.

(56) References Cited

U.S. PATENT DOCUMENTS

| 3,451,827 | A | 6/1969 | Bridgeford ................... 99/176 |
|---|---|---|---|
| 3,898,348 | A | 8/1975 | Chiu et al. ................... 426/413 |
| 4,137,947 | A | 2/1979 | Bridgeford ................ 138/118.1 |
| 4,888,223 | A | 12/1989 | Sugimoto et al. .......... 428/34.9 |
| 5,358,784 | A | 10/1994 | Hammer et al. ............ 428/34.8 |
| 5,928,738 | A | 7/1999 | Auf Der Heide et al. |
| 6,086,929 | A | 7/2000 | Stall ............................. 426/92 |
| 6,194,040 | B1 | 2/2001 | Delius et al. ................ 428/34.8 |
| 2002/0039611 | A1 | 4/2002 | Grolig et al. ................. 426/135 |

FOREIGN PATENT DOCUMENTS

| DE | 196 25 094 A1 | 1/1998 |
|---|---|---|
| DE | 100 09 979 | 9/2001 |
| DE | 101 25 2007 A1 | 11/2002 |
| EP | 0180 207 A2 | 5/1986 |
| EP | 1013173 A2 | 5/1986 |
| EP | 0 573 306 A2 | 12/1993 |
| EP | 0 589431 | 3/1994 |
| EP | 0 640289 A1 | 3/1995 |
| EP | 0 640 289 A2 | 6/2000 |
| EP | 1 013 173 A1 | 6/2000 |
| EP | 1 338 204 A1 | 8/2003 |
| WO | WO 98/17120 | 4/1998 |
| WO | WO 02/082913 A1 | 10/2002 |

OTHER PUBLICATIONS

G. Effenberger, Wursthüllen—Kunstdarm "Sausage casings, artificial skin", Holzmann Verlag GmbH & Co. KG, Bad Wörishofen, 2$^{nd}$ Edition [1991] pp. 58-60.

*Primary Examiner*—Michael C Miggins
(74) *Attorney, Agent, or Firm*—ProPat, L.L.C.

(57) ABSTRACT

Disclosed is a shined tubular food casing based on a thermoplastic blend of at least one polyamide and/or copolyamide and at least one hydrophilic component. The casing is biaxially stretch-oriented and impregnated on the inside and/or outside with a component which allows the pleats which are formed during shining of the casing to adhere to each other. The component preferably comprises at least one polymer. The casing is preferably shirred at a ratio of 80:1 to 500:1. The inventive shined casing is particularly stable from a mechanical perspective and can therefore be used especially for the production of cooked sausages, scalded-emulsion sausages, and small sausages on fully automatic sausage stuffing and clipping apparatuses.

16 Claims, No Drawings

INTRINSICALLY STABLE SHIRRED PLASTIC FOOD CASING

CROSS REFERENCE TO RELATED APPLICATIONS

This application is being filed under Rule 1.371 as a National Stage Application of pending International Application No. PCT/EP2004/009395, which claims priority to the following parent application: German Patent Application No. 103 39 801.3 filed Aug. 27, 2003. Both International Application No. PCT/EP2004/009395 and German Patent Application No. 103 39 801.3 are hereby incorporated by reference herein in their entirety.

FIELD OF THE INVENTION

The invention relates to a shirred tubular food casing based on thermoplastic. It is suitable in particular for producing cooked-meat sausages and scalded-emulsion sausages, and also small sausages on automatic filling units.

BACKGROUND OF THE INVENTION

Food casings, in particular sausage casings, are frequently offered in a form in which in each case approximately 15 to 100 m of the casing are telescoped together to form 20 to 120 cm long "sticks" (also "strands" or "slugs"). The shirring of artificial skins has long been known and is also described (see G. Effenberger: Wursthüllen-Kunstdarm [Sausage casings, artificial skin], H. Holtzmann Verlag GmbH & Co KG, Bad Wörishofen, 2nd edition [1991] pp. 58 to 60). It is performed on what are termed shirring machines. Before shirring, the casing is laid flat and rolled up. It is taken off from the roll, inflated and pushed onto the shirring mandrel. The outer diameter of the shirring mandrel determines the inner passage width of the stick to be produced. Arranged around the shirring mandrel is a driven shirring tool which grips the casing on the outer surface, transports it axially on the shirring mandrel, and in the course of this plays it into uniform pleats. The shirring tools can have different constructions. Those which are known are, e.g., arrangements of shirring wheels which on the outside can be shaped to be toothed or else smooth, in addition also shirring belts and spiral shirring elements. The friction on the shirring mandrel and shirring tool is a high thermal and mechanical stress for the casing. Immediately before or during the shirring, it is therefore customarily wetted with a lubricant (oil, water or corresponding emulsions) on the inside, from the outside or from both sides. This prevents, inter alia, cracks or other damage occurring at the pleats. Shirring damage can also occur if the degree of compaction (compression density=casing length per stick) is selected to be too high. As soon as the desired length of casing material has passed through the shirring tool, the casing is cut off at the feed and the resultant stick is pushed down from the shirring mandrel.

The resultant stick should be as dimensionally stable, self-supporting and mechanically robust as possible so that it withstands transport, packaging and further handling at the processor without problems. During stuffing with sausage mix, the stick is again "deshirred" in a controlled manner. For this, frequently a plurality of sticks are placed in a storage container from which individual specimens are automatically withdrawn one after the other and pushed onto the stuffing horn of the stuffing machine. It is indispensable here that the stick does not break and retains its preset shape unchanged. Otherwise, faults occur in the automatic sequence of the stuffing operation, which must be alleviated laboriously by hand.

The ability of casings to form intrinsically stable sticks is, depending on the material used, very variable. Currently, sausage casings based on the following materials are predominantly used:
 regenerated cellulose
 collagen
 thermoplastics, of which, in particular, PVDC, polyamide, the latter also in the form of multilayer structures having additional layers of polyolefins and other plastics.

Solely casings made of regenerated cellulose may be processed (within limits) to form intrinsically stable sticks. The advantage of cellulose here is a certain tendency to form "standing pleats" (like paper). A condition is a defined humidity of the tube to be shirred in order to achieve a suitable ratio of stiffness and suppleness. Frequently, casings made of regenerated cellulose, before shirring, are provided on the inside with an impregnation or solution coating. These treatments serve, primarily, to set in a targeted manner the adhesion of the casing to the sausage surface and to enable easy later detachment of the casing. A multiplicity of impregnating or coating agents have already been described, including those which additionally cause a certain "bonding" of the later shirring pleats to one another and as a result additionally stabilize the stick.

The known impregnating or coating formulas are mostly based on water-soluble and/or water-emulsifiable substances and are introduced into the casing as aqueous preparation. The high swelling capacity of the cellulose is utilized here; as a result, (in the case of not too high inherent moisture of the casing), the water fraction of the introduced preparation is immediately absorbed by the cellulose, and the constituents, after a short time, form a dry coating on the surface. In the case of "bonding" constituents, the shirring is carried out immediately after the coating, so that the solidification of the substances and the bonding of the surfaces first takes place on the finished sticks.

Examples of such "bonding" coating formulas for cellulose casings are:
 water-soluble cellulose ethers in combination with an oil or an alkylene oxide adduct of a fatty acid partial ester (U.S. Pat. No. 3,898,348),
 water-soluble cellulose ethers in combination with a fatty acid partial ester of sorbitan or mannitol and a water-soluble polyalkylene ether (U.S. Pat. No. 4,137,947),
 mixtures of anionic and nonionic water-soluble cellulose ethers and lubricant (EP-A 0 180 207),
 lecithin in combination with at least one of the substances alginate, chitosan, casein (U.S. Pat. No. 5,358,784),
 mixtures of carboxymethylcellulose (CMC) and polyethylene glycol, if appropriate combined with polysorbate, sorbitan oleate, methylcellulose (MC), lecithin, or mineral oil (U.S. Pat. No. 6,086,929).

In contrast to the casings based on regenerated cellulose, casings made of plastic are generally considered unsuitable for producing intrinsically stable sticks. Shirred plastic casings, after they are removed from the shirring mandrel, are immediately covered with a tubular net or with a film. Otherwise, there is an unwanted expansion of the sticks in the longitudinal direction (decompacting), followed by opening of individual pleats up to complete loss of shape. This net or film covering must be removed manually by the processor as soon as the stick has been pushed onto the stuffing horn of the stuffing machine. The working step of removal is unwanted, in particular, because it cannot be reliably automated and to this extent the stuffing process overall cannot be carried out in a fully automated manner.

In addition, it is known to shirr plastic casings on a sleeve and to set the shirred material using limit disks (Effenberger, loc. cit., p. 58). This is laborious and therefore disadvantageous.

The possible methods for stabilizing sticks discussed above for casings made of regenerated cellulose are not applicable with customary plastic casings. Firstly, the plastics suitable for casings (polyamide, PVDC) have distinctly elastic recovery properties; a pleat embossed into a film "opens" readily, and the film takes on approximately again its planar shape. Secondly, plastics, compared with cellulose, have virtually no swelling capacity and only low water vapor permeation. An impregnation or coating applied to the interior would remain moist over a long period and not cause the desired "bonding" of the shirred pleats after the shirring process.

The advantages of casings made from regenerated cellulose are, unfortunately, counteracted by their complex and environmentally-polluting technical production. They are generally produced by the viscose method in which the cellulose is first converted into cellulose xanthogenate using sodium hydroxide solution and carbon disulfide ($CS_2$). The resultant viscose solution must first mature for several days before it is passed to the skin spinning machines. These machines essentially comprise a spinning die, precipitation baths, wash and preparation baths and also drying stations. In the precipitation baths the cellulose xanthogenate is regenerated to cellulose. Byproducts produced are hydrogen sulfide ($H_2S$) and sodium sulfate. These substances must be continuously collected and disposed of.

Casings made of customary thermoplastics are, in contrast, technically simple and inexpensive to produce. The customary plastics such as polyamide and polyethylene can be obtained ready-to-process from the manufacturers, and converted directly to casings by extrusion and tubular film blowing or tubular film stretching methods.

SUMMARY OF ADVANTAGEOUS EMBODIMENTS OF THE INVENTION

The object was thus to provide an intrinsically stable stick based on a plastic casing, which manages without net or film covering. The corresponding casing should be suitable for producing cooked-meat sausage and scalded-emulsion sausage, and also for producing small sausages. Furthermore, the casing should be producible by the customary thermoplastic route, and thus inexpensively.

DETAILED DESCRIPTION OF ADVANTAGEOUS EMBODIMENTS OF THE INVENTION

The object is achieved by a shirred tubular food casing based on thermoplastic in which the thermoplastic comprises a blend of at least one polyamide and/or copolyamide and at least one hydrophilic component, and the casing is biaxially stretch-oriented and is impregnated on the inside and/or outside with a component which allows the pleats of the casing to adhere to one another. The hydrophilic component gives the casing a swelling capacity so high that it immediately absorbs water from the impregnation applied in the form of an aqueous composition, so that even immediately after shirring, bonding of the shirred pleats occurs. This is achieved by the longitudinal expansion of the sticks, determined by the measurement methods specified below, being no more than 8%, preferably 6% or less. The inventive shirred stick is extraordinarily stable. Using as a basis a caliber of 38 mm, it does not break (under the measurement conditions likewise described below) until under the action of a force of 100 N or more, preferably 120 N or more. It is not combined with a shirring sleeve or similar aid.

For the inventive shirred stick, preferably use is made of a casing based on a blend of polyamide(s) and/or copolyamide(s) and at least one hydrophilic component. (Co) polyamides which come into consideration here are primarily aliphatic (co)polyamides. These are, in particular, linear aliphatic (co)polyamides, such as nylon 6 (poly($\epsilon$-caprolactam)= homopolymer of $\epsilon$-caprolactam or 6-aminohexanoic acid), nylon 6/6.6 (copolyamide of $\epsilon$-caprolactam, hexamethylenediamine and adipic acid), nylon 6/6.9 (copolyamide of $\epsilon$-caprolactam, hexamethylenediamine and azelaic acid), nylon 6/66.12 (copolyamide of $\epsilon$-caprolactam, hexamethylenediamine, adipic acid and laurolactam), nylon 6.9 (polyamide of hexamethylenediamine and azelaic acid), nylon 6.10 (polyhexamethylene sebacimide=polyamide of hexamethylenediamine and sebacic acid), nylon 6/12 (polyamide of 8-caprolactam and $\omega$-aminolaurolactam) and nylon 12 (poly($\epsilon$-laurolactam)=homopolymer of $\omega$-aminolaurolactam).

As hydrophilic component, natural and synthetic polymers having pronounced swelling capacity or solubility in water come into consideration. The natural or synthetic polymers should correspondingly be able to take up at least 20% by weight, preferably at least 40% by weight, of their own weight of water. Suitable synthetic polymers are the following:

1) heterofunctional polyamides, in particular polyether amides, polyester amides, polyether ester amides and polyamido urethanes. Polymers especially suitable among these polymers are those having a block-type distribution of the various functionalities, i.e. block copolymers. Particularly preferred block copolymers are poly(ether block amides), characterized by the following structural elements:

a) at least one amide moiety containing units a1) of at least bifunctional aliphatic and/or cycloaliphatic amines (especially hexamethylenediamine or isophoronediamine) and of at least bifunctional aliphatic and/or cycloaliphatic and/or aromatic carboxylic acids (especially adipic acid, sebacic acid, cyclohexanedicarboxylic acid, isophthalic acid or trimellitic acid), or a2) of aliphatic aminocarboxylic acids, in particular w-aminocarboxylic acids, or their lactams (especially $\epsilon$-caprolactam or $\omega$-laurolactam) or a3) mixtures of a1) and a2) and b) at least one glycol or polyglycol moiety containing units b1) of an at least bifunctional, aliphatic and/or cycloaliphatic alcohol having 2 to 15 carbon atoms, in particular 2 to 6 carbon atoms (especially ethylene glycol, propane-1,2-diol, propane-1,3-diol, butane-1, 4-diol or trimethylolpropane) or b2) of an oligoglycol or polyglycol of one or more of the alcohols mentioned in b1) (especially diethylene glycol, triethylene glycol, polyethylene glycol or poly(1, 2-propylene glycol) or b3) of at least one aliphatic oligoglycol or polyglycol of the type mentioned in b2), the terminal hydroxyl groups of which are replaced by amino groups (®Jeffamines) or b4) of a mixture of b1), b2) and/or b3) or b5) of an ester-containing polyglycolic moiety formed from at least bifunctional aliphatic alcohols (especially ethylene glycol or 1,2-propylene glycol) and at least divalent aliphatic, cycloaliphatic and/or aromatic dicarboxylic acids (especially adipic acid, sebacic acid or isophthalic acid) or b6) of a mixture of b1), b2) and/or b5);

2) copolyether esters, preferably poly(ether ester) block copolymers, characterized by the following structural elements:
   a) at least one dicarboxylic acid unit, in particular units of phthalic acid, isophthalic acid, terephthalic acid, naphthalene-2,6-dicarboxylic acid, naphthalene-2,7-dicarboxylic acid, glutaric acid, adipic acid, sebacic acid and cyclohexane-1,4-dicarboxylic acid and
   b) at least one glycol, oligoglycol or polyglycol moiety containing units
      b1) of an at least bifunctional, aliphatic and/or cycloaliphatic alcohol having 2 to 15 carbon atoms, in particular 2 to 6 carbon atoms (especially ethylene glycol, propane-1,2-diol, propane-1,3-diol, butane-1,4-diol or trimethylolpropane) and/or
      b2) of an oligoglycol or polyglycol of one or more of the alcohols mentioned in b1) (especially diethylene glycol, triethylene glycol, polyethylene glycol or poly(1,2-propylene glycol);

3) water-soluble synthetic polymers, preferably
   a) polyvinyl alcohols (PVAL), as are obtainable by partial or complete saponification of polyvinyl acetate (PVAC) or copolymers with vinyl alcohol units (for example a copolymer containing units of vinyl alcohol and propen-1-ol),
   b) polyalkylene glycols, in particular polyethylene glycols, polypropylene glycols or corresponding copolymer containing alkylene glycol units, in particular ethylene glycol and/or propylene glycol units, and units of other monomers,
   c) polyvinylpyrrolidone or water-soluble copolymers containing vinylpyrrolidone units and units of at least one $\alpha,\beta$-olefinically unsaturated monomer,
   d) polymers of N-vinylalkylamides, e.g. poly(N-vinylformamide), poly(N-vinylacetamide) and copolymers containing units of N-vinylalkylamides and units of at least one $\alpha,\beta$-olefinically unsaturated monomer or
   e) (co)polymers of or containing units of $\alpha,\beta$-unsaturated carboxylic acids or $\alpha,\beta$-unsaturated carboxamides, in particular containing units of (meth)acrylic acid and/or (meth)acrylamide.

4) Suitable natural polymers are as follows: natural hydrophilic polymers, in particular polysaccharides, e.g. starch (native or destructured, in the latter case having additions of plasticizer such as glycerol), cellulose (in the form of powders or short fibers, in which case the short fibers can be of native origin or fibers produced by viscose spinning), exopolysaccharides (such as carrageenan, locust bean gum or guar gum) and polysaccharide derivatives (such as crosslinked starch, starch esters, cellulose esters, cellulose ethers or carboxyalkylcellulose ethers).

Within the preceding enumeration, (1) and (3) are preferred. Particular preference is given to poly(ether block amides) of units according to 1)a3) and 1)b2), polyvinyl alcohols according to 3a) having a mean molecular weight $M_W$ of 10 000 to 50 000 and a degree of saponification of the acetate groups in the range 75 to 98%, and also mixtures of these two polymer types.

If appropriate the casing further contains customary additives, such as stabilizers, lubricants, antiblock pigments, inorganic or organic color pigments and also plasticizers such as glycerol, the latter in particular when substances according to 4) are used.

The casing which has been finished to give the inventive shirred sticks generally exhibits a water absorption capacity of 10 to 50% by weight, based on its dry weight. To determine the water absorption capacity, a sample is placed for 2 hours in water at a temperature of 23° C. Subsequently the surface of the sample is wiped dry. The water fraction is then determined by Karl-Fischer titration.

Stretch-oriented casings based on mixtures of polyamide(s) and hydrophilic polymers are already known. For example, DE-A 101 25 207 describes casings based on mixtures of aliphatic (co)polyamides and glycol- and/or polyglycol-modified polyamides. WO 02/082913, in contrast, discloses casings which contain polyamide and a block copolyether ester.

The tubular seamless casing then finished to form shirred sticks is produced by methods which are known to those skilled in the art. In these, generally a blend of the polyamide or the polyamides, at least one of the abovementioned hydrophilic components, and also if appropriate additives, is extruded to form a seamless tube which is then subjected to a stretching process. The blend is produced in the simplest case by mechanical mixing of the granular components and subsequent melting and homogenizing of the mixture in the film extruder. In some cases it is expedient first to premix and plasticize the hydrophilic component(s) with one or more plasticizers, e.g. glycerol, ethylene glycol, water. This process is performed, e.g., in a heatable stirred tank in which the hydrophilic component(s) is placed together with the plasticizer(s) and heated with stirring (approximately 120° C.) until a uniform distribution of the plasticizer(s) has occurred. The product produced after the cooling can be fed directly to the abovementioned extruder, or converted in advance to granules.

After melting and homogenizing in the extruder, the blend is passed through a ring die, a primary tube having relatively high wall thickness being formed. This tube is cooled rapidly to freeze the amorphous state of the polymers. Subsequently it is again heated to a temperature suitable for stretching (about 60 to 90° C.) and stretched in the transverse direction by means of an air cushion enclosed between two driven pinch-roll pairs. A longitudinal stretching is superimposed on the transverse stretching. This longitudinal stretching is customarily performed by setting in the second pinch-roll pair a peripheral velocity higher than that of the first pair. The area stretching ratio (=product of transverse and longitudinal stretching ratio) is about 6 to 18, preferably 8 to 11. The wall thickness of the casing is then in the range from 12 to 60 μm, preferably from 20 to 45 μm. The casing is generally single layered. Since the casing is primarily intended for cooked-meat sausages and scalded-emulsion sausages, and also for small sausages, it generally has a nominal caliber of 14 to 48 mm, preferably 18 to 40 mm.

After stretching, the tube is expediently further heat set. The heat setting allows the shrinkage behavior to be set in a targeted manner. Finally, the tube is cooled, laid flat and wound up to form rolls.

A further feature of the present invention is impregnating or wetting the tubular casing with an adhesion component which preferably comprises at least one high-molecular-weight compound having adhesion properties and if appropriate further components. Suitable high-molecular-weight compounds are water-soluble polymers whose solutions become sticky on drying, i.e. which develop strong adhesion to adjacent tube surfaces and are suitable, on subsequent shirring, for mechanically stabilizing the pleats which are formed against one another. Those which are particularly suitable are water-soluble cellulose ethers, especially methylcellulose (MC), carboxymethylcellulose (CMC), carboxymethylhydroxyethylcellulose (CM-HEC), hydroxyethylcellulose (HEC), methylhydroxyethylcellulose (M-HEC) and also the sodium salts of CMC and CM-HEC. Preference is given to M-HEC and CMC sodium salt. Polymers which are likewise suitable, in particular in combination with a cellulose ether, are polyalkylene glycols, preferably polyethylene glycol having a molecular weight $M_n$ in the range 200 to 1500, in addition monoalkyl and dialkyl ethers of polyalkylene glycols.

To achieve the desired bonding effect, even small applied amounts of polymers are sufficient. The exact amount depends, inter alia, on the desired stability of the later sticks. In general, the casing should be impregnated with about 2 to 500 mg/m², preferably about 20 to 250 mg/m², particularly preferably about 50 to 150 mg/m², of polymer(s) having adhesion properties.

The impregnation can be applied optionally to the outer or inner tube surface, or else on both surfaces. Preferably, it is applied to the inner surface. This opens up the possibility of choosing the impregnation in such a manner that the adhesion of the sausage meat emulsion to the surface and the later peelability of the casing are set simultaneously in the desired manner.

To improve the peelability of the casing from the food, impregnations from polymer(s) of the abovementioned type are suggested in combination with other water-soluble or water-emulsifiable substances, e.g. fatty acid partial esters of glycerol, other polyols or glucosides, in addition natural substances such as lecithin, casein, alginic acid and salts thereof, vegetable oils, mineral oils and silicone oils. These further substances should be used at a lower concentration than the abovementioned water-soluble polymers. Preference is given to combinations of one or two water-soluble polymer(s) with a glycerol fatty acid partial ester and an oil. Particular preference is given to the combination of CMC sodium salt as main component with a glycerol fatty acid monoester, lecithin and paraffin oil.

The impregnation is expediently produced by treating the tube with an aqueous solution or an oil-in-water emulsion immediately before or during the shirring process. Preferably, the coating apparatus is integrated into the shirring machine and arranged in such a manner that the coating is applied in time less than one second before the shirring operation. For coating the outer surface, a method which comes into consideration is continuously passing the tube through an immersion bath containing the solution, or spraying the tube by means of atomizer nozzles. The inner surface is best coated by spraying with a radially acting nozzle which is mounted at the end of the shirring mandrel facing the tube feed. Shirring machines having such "inner mandrel spraying" are described, e.g., in U.S. Pat. No. 3,451,827.

The coating solution should be employed as highly concentrated as possible in order to achieve rapid thickening of the coating on the tube surface and thus rapid onset of adhesion. The solution concentration is limited upward on the basis of the viscosity of the solution. Excessively viscous solutions can no longer be uniformly sprayed, or sprayed only with great technical effort. Typical solutions for inner spraying contain about 1 to 3% by weight of cellulose ether.

Suitable methods for shirring the coated casing are, in principle, all shirring methods of the prior art. Preference is given to methods in which the tube is compacted by means of shirring wheels (also termed paddle or axial methods). Particular preference is given to methods having rotating shirring elements constructed on the inside as spirals (also termed screw method). In addition, preference is given to what are termed multiple mandrel machines in which a plurality of shirring mandrels are movably arranged (e.g. on a revolving disk) and in circulation are alternately brought into interaction with the shirring element. These systems have the advantage that the sticks just formed further remain for a certain time on the respective shirring mandrel and are stabilized by this until onset of the bonding. The shirring ratio (=compression factor) is generally 80:1 to 500:1, preferably 100:1 to 400:1. The shirring ratio is conjointly determined by the wall thickness and the caliber of the casing.

Shirring machines having an integrated coating apparatus are preferred. Especially preferred are machines having a coating technique according to the inner mandrel spray method; in these, the coating solution is transported through boreholes within the shirring mandrel and via a nozzle, which is arranged at the end of the shirring mandrel facing toward the tube feed, sprayed radially against the inner surface of the moving tube.

The inventive shirred food casing is used in particular in the production of cooked-meat sausages and scalded-emulsion sausages, and also of small sausages on fully automatic sausage stuffing and clipping apparatuses.

The examples hereinafter serve to illustrate the invention. Percentages are by weight unless stated otherwise or obvious from the context.

EXAMPLES

Quantities Measured

Water Absorption:

Samples of the tube material are cut open and placed for 2 h in water at 23° C., subsequently taken out, wiped dry on the surface with paper towels and stored in PE pouches until measurement. The water content is determined by Karl-Fischer titration.

Longitudinal Expansion of the Sticks:

Sticks ejected from the shirring machine are loosely gripped with the hands and deposited on a planar support. After 10 minutes, the distance between the stick ends was determined using a ruler. Any loose casing material at the stick ends is not included in the measurement. Per experiment, the measurements of 5 sticks are averaged. The longitudinal expansion is given by:

$$\Delta = \frac{\text{measured stick length} - \text{machine-side press length}}{\text{machine-side press length}} \times 100\, [\%]$$

Breaking Stress (of the Sticks):

A Zwick 1445 mechanical testing instrument is fitted with a breaking test tool set. This comprises two fixed prism-shaped support stands having an open distance of 115 mm and also a movable plunger connected to the force measuring apparatus. The plunger has the shape of a flat wedge, the cutting edge of which has a rounding radius of 5 mm. The cutting edge is directed parallel to the plane of the support stands and centrally between these.

A stick is placed on the support stands; subsequently the plunger moves at a speed of 10 mm/min against the stick and continues its path until the stick bends. The force applied is recorded continuously and displayed graphically. The breaking stress is defined as the maximum force up to the first discontinuity of the force-distance curve (beginning of the breaking process).

| Charge materials | |
|---|---|
| PA1: | Nylon 6 having a relative viscosity of 4 (measured in 96% strength sulfuric acid), ULTRAMID ® B4 from BASF AG |
| PA2: | Nylon 6/66 (weight ratio 85:15 parts by weight) having a relative viscosity of 4 (measured in 96% strength sulfuric acid), ULTRAMID ® C4 from BASF AG |
| PEA: | Copolymer based on -caprolactam, hexamethylenediamine, adipic acid and polyethylene glycol (having on average about 10 ethylene glycol units); melting point 210° C. (determined by differential scanning calorimetry, DSC), GRILON ® FE 7012 from Ems-Chemie AG, |
| PVAL: | Polyvinyl alcohol having a mean molecular weight $M_w$ of 26 000 and a degree of saponification of 88% (MOWIOL ® 26-88 from Clariant Deutschland GmbH) |
| Glycerol | 96% pure, purity as specified by DAB (Deutsches Arzneimittelbuch [German pharmacopoeia]) |
| MB | Filler masterbatch comprising 50% nylon 6 and 50% finely divided calcium carbonate (HT-MAB-PA 9098 from Treffert) |
| CMC-Na | Sodium salt of a carboxymethylcellulose of medium degree of etherification and a solution viscosity of 10 Pa s, measured by 2% strength solution at 20° C. by Höppler viscometer (TYLOPUR ® C 10000 P2 from Clariant Deutschland GmbH) |
| M-HEC | Methylhydroxyethylcellulose of medium degree of etherification and a solution viscosity of 4 Pa s, measured on a 2% strength aqueous solution at 20° C. using a Höppler viscometer (TYLOSE ® H 4000 P2 from Clariant Deutschland GmbH) |
| Glycerol Lecithin | monooleate (ARLACEL ® 186 from Uniquema; to ICI plc) |
| Paraffin oil | medical white oil ENERPAR ® M 1930 from British Petroleum (BP) plc |

Examples 1 and 2 and Comparative Example C1

Production of Biaxially Oriented Casings

The components mentioned in table 1 for each example were mixed mechanically at room temperature. Each mixture was then plasticized to give a homogeneous melt in a single-screw extruder at 220° C. and extruded at 190° C. through a ring die to give a primary tube. The tube was cooled rapidly then heated to the minimum temperature (about 70° C.) required for stretching, biaxially stretched using internally acting compressed air and then heat set in a further heating zone. The heat setting reduced the transverse stretching by about 10%. The finished casings were laid flat and wound up to form rolls.

The stretching ratios of the finished food casings and also their wall thicknesses can likewise be seen in table 1. All casings were produced having a final diameter of 38.2 mm, corresponding to a flat width of 60 mm. The primary tube diameter was not reported; it may readily be calculated by dividing the final diameter (38.2 mm) by the reported total degree of transverse stretching.

TABLE 1

Production data for casing examples

| | Examples | | |
|---|---|---|---|
| | 1 | 2 | C1 |
| Polyamide [% by weight] | PA1 30 PA2 33 | PA2 70 | PA1 65 PA2 33 |

TABLE 1-continued

Production data for casing examples

| | Examples | | |
|---|---|---|---|
| | 1 | 2 | C1 |
| Hydrophilic component | PEA 35 | PVAL 25 | — |
| Further component(s) [% by weight] | MB 2 | MB 2 Glycerin 3 | MB 2 |
| Total degree of transverse stretching | 2.73 | 2.93 | 2.73 |
| Total degree of longitudinal stretching | 2.75 | 2.64 | 2.75 |
| Wall thickness of the final tube | 25 μm | 27 μm | 24 μm |
| Water absorption of the tube [% by weight] | 14.5 | 18.7 | 9.1 |

Examples 3 to 6 and Also Comparative Examples C2 and C3

Production of Sticks

For production of the sticks, a commercially conventional multiple mandrel shirring machine (Kollross) was used which operates by the screw method (rotary shirring element which is formed internally as a spiral). The machine was equipped with a revolver change system for the total of 6 shirring mandrels. For liquid to be applied to the tube inner surface, each shirring mandrel had internal channels which opened out into an atomizer nozzle arranged at the end of the mandrel. In addition, the machine contained nozzles for spraying the outer surface of the tube. In all experiments the casings were sprayed externally with a small amount of paraffin oil. This served for keeping low the friction between tube and shirring element and avoiding occurrence of damage. The shirring machine contained a settable stop for sticks respectively just formed. Via this, the sticks were kept compressed while the tube end was cut off to a preset length (pressed length) of 400 mm. Each stick remained on its shirring mandrel until the revolver system had completed approximately three quarters of a rotation; subsequently it was automatically pushed off from the mandrel and ejected laterally.

Uniform Parameters:

Flat width of the casings: 60 mm (a area per running meter 1200 cm$^2$)

Running speed on spraying and shirring=175 m/min

Shirring length per stick=50 m

Pressed length of a stick (imposed on shirring)=400 mm→shirring ratio (compression factor)=125

Residence time of stick on shirring mandrel (until ejection from the machine)=3 min Table 2 gives the casings used in the shirring experiments and also type and amount of the internally sprayed coatings. In addition, the table contains the test values on intrinsic stability (longitudinal expansion and breaking tension) determined on the finished sticks.

The values clearly show the superiority of the inventive examples over the comparative experiments.

TABLE 2

Production and test data of the sticks

| Example No. | Casing material | Component spray solution [% by weight] | | Application rate [l/h] | Application rate cellulose ether* [mg/m²] | Longitudinal expansion factor Δ [%] | Breaking tension [N] |
|---|---|---|---|---|---|---|---|
| 3 | as example 1 | CMC-NA Glycerol monooleate Lecithin Paraffin oil | 2 0.3 0.3 0.8 | 5 | 78 (=9.4 mg/m) | 5 | 140 |
| 4 | as example 1 | M-HEC Glycerol monooleate | 3 0.5 | " | 78 (=9.4 mg/m) | 6 | 125 |
| 5 | as example 2 | CMC-NA Glycerol monooleate Lecithin Paraffin oil | 2 0.3 0.3 0.8 | 6 | 95 (=11.4 mg/m) | 4 | 180 |
| 6 | as example 2 | M-HEC Glycerol monooleate | 3 0.5 | " | 95 (=11.4 mg/m) | 5 | 135 |
| C2 | as example C1 | CMC-NA Glycerol monooleate Lecithin Paraffin oil | 2 0.3 0.3 0.8 | 5 | 78 | ∞ stick unstable | not determinable (stick yields continuously to the pressure) |
| C3 | as example 1 | Pure water | | 5 | — | 12 | approximately 50 (no defined breakage) |

*Calculated from application rate, concentration of the cellulose ether, running speed and casing surface area

The invention claimed is:

1. A shirred tubular food casing comprising pleats, said food casing comprises a blend of at least one polyamide and/or (co)polyamide and at least one hydrophilic component, wherein the casing is biaxially stretch-oriented and is impregnated on the inside and/or outside with at least one component which allows the pleats of the casing to adhere to one another.

2. The shirred food casing as claimed in claim 1, wherein the (co)polyamide is an aliphatic (co)polyamide.

3. The shirred food casing as claimed in claim 1, wherein the hydrophilic component is a polyether amide, polyester amide, polyether ester amide or polyamido urethane.

4. The shirred food casing as claimed in claim 1, wherein the component used for the impregnation is a water-soluble cellulose ether and/or a polyalkylene glycol.

5. The shirred food casing as claimed in claim 1, wherein it is coated on the inside and/or outside with about 2 to 500 mg/m² of a component having adhesion properties.

6. The shirred food casing as claimed in claim 1, wherein the casing is stretched in an area stretching ratio of 6 to 18.

7. The shirred food casing as claimed in claim 1, wherein the casing is heat set.

8. The shined food casing as claimed in claim 1, wherein the casing is single layered.

9. The shined food casing as claimed in claim 1, wherein the wall thickness of the casing is 12 to 60 m.

10. The shirred food casing as claimed in claim 1, wherein the casing can take up 10 to 50% by weight of water, based on its dry weight.

11. The shirred food casing as claimed in claim 1, wherein the shining ratio is 80:1 to 500:1.

12. Cooked-meat sausages, scalded-emulsion sausages, and small sausages comprising the shirred food casing as claimed in claim 1.

13. The shined food casing as claimed in claim 1, wherein the hydrophilic component is a natural and/or synthetic polymer which can take up at least 20% by weight of its own weight of water.

14. The shirred food casing as claimed in claim 13, wherein the natural polymer is a polysaccharide.

15. The shirred food casing as claimed in claim 1, wherein the hydrophilic component is a water-soluble synthetic polymer.

16. The shined food casing as claimed in claim 15, wherein the water-soluble synthetic polymer is a polyvinyl alcohol, a vinylpyrrolidone (co)polymer, a polyalkylene glycol, a (co)polymer containing units of N-vinylalkylamides, or a (co)polymer containing units of (meth)acrylic acid or (meth)acrylamide.

* * * * *

UNITED STATES PATENT AND TRADEMARK OFFICE
CERTIFICATE OF CORRECTION

| | | |
|---|---|---|
| PATENT NO. | : 7,803,437 B2 | Page 1 of 1 |
| APPLICATION NO. | : 10/568464 | |
| DATED | : September 28, 2010 | |
| INVENTOR(S) | : Delius et al. | |

It is certified that error appears in the above-identified patent and that said Letters Patent is hereby corrected as shown below:

Title Page
Item (57), Abstract

Line 6, delete "shining" insert --shirring--

Line 9, delete "shined" insert --shirred--

Signed and Sealed this

Sixteenth Day of November, 2010

David J. Kappos
*Director of the United States Patent and Trademark Office*